United States Patent [19]

Moriwake et al.

[11] Patent Number: 5,598,486
[45] Date of Patent: Jan. 28, 1997

[54] IMAGE TRANSFORMATION APPARATUS

[75] Inventors: Katsuakira Moriwake; Toshihiro Shiraishi, both of Kanagawa, Japan

[73] Assignee: Sony Corporation, Tokyo, Japan

[21] Appl. No.: 227,031

[22] Filed: Apr. 13, 1994

[30] Foreign Application Priority Data

Apr. 17, 1993 [JP] Japan ................... 5-113966

[51] Int. Cl.⁶ ..................................... G06K 9/32
[52] U.S. Cl. .................... 382/293; 348/580; 364/731
[58] Field of Search .................... 382/41, 44, 276, 382/293, 296, 298; 348/578, 580; 364/731; 345/190; 340/724, 727

[56] References Cited

U.S. PATENT DOCUMENTS

| | | | |
|---|---|---|---|
| 4,011,401 | 3/1977 | Presti | 348/578 |
| 4,533,952 | 8/1985 | Norman, III | 348/580 |
| 4,697,185 | 9/1987 | Thomas et al. | 364/731 |
| 4,751,660 | 6/1988 | Hedley | 382/44 |
| 4,752,828 | 6/1988 | Chapuis et al. | 348/580 |
| 5,051,734 | 9/1991 | Lake, Jr. | 364/731 |
| 5,067,019 | 11/1991 | Juday et al. | 348/580 |

FOREIGN PATENT DOCUMENTS

| | | | |
|---|---|---|---|
| 0128789 | 12/1984 | European Pat. Off. | H04N 5/22 |
| 0260144 | 3/1988 | European Pat. Off. | G06F 15/62 |
| 0437074 | 7/1991 | European Pat. Off. | G06F 15/62 |

Primary Examiner—Leo Boudreau
Assistant Examiner—Phuoc Tran
Attorney, Agent, or Firm—William S. Frommer; Alvin Sinderbrand

[57] ABSTRACT

In an image transformation apparatus, the image formed by an input video signal is stored into a memory, and the input video signal is read based on a read-address data of a predetermined read-address generator means, to execute a predetermined image transformation with respect to an image. The transformed image is formed by using a function in which a distance from the center of the transformed image is changeable corresponding to an angle from the center of that, so as to obtain the lens effect transforming the image into images having various curvilinearly shapes.

12 Claims, 6 Drawing Sheets

IMAGE TRANSFORMATION APPARATUS

BACKGROUND OF THE INVENTION

1. Field of the Invention

This invention relates to an image transformation apparatus, and more particularly, to video special effect processing for rendering a special effect, for example, to a video signal.

2. Description of the Related Art

Heretofore, an image transformation apparatus is disclosed, for example, in U.S. Pat. No. 5,070,465.

In this type of image transformation apparatus, an input signal is sequentially written to a predetermined region of a frame memory on the basis of a write-address data output from a write-address generating circuit, and data in the frame memory is read based on a read-address data input from a read-address generating circuit, so that the video signal is rendered various special effects to display the modified image.

In such image transformation apparatus of the read-address control system, it has been difficult to render a special effect for forming a curvilinearly modified picture image such as consisting of a star or heart.

SUMMARY OF THE INVENTION

In view of the foregoing, an object of this invention is to provide an image transformation apparatus in which, a lens effect for transforming an image into a curvilinearly modified picture image such as of a star or heart can be obtained.

The foregoing object and other objects of this invention have been achieved by the provision of an image transformation apparatus 10 in which, the image formed by an input video signal S1 is stored into a memory 11, and the input video signal of the memory 11 is read based on a read-address data of a predetermined read-address generating means 13, to execute a predetermined image transformation with respect to an image, the image transformation apparatus 10 comprising: converting means 23 for converting a read-address represented by the orthogonal coordinates into the polar coordinate data; compute means for determining the result which is divided the curvature radius of a transforming image r into the function representing the shape of the transforming image G, to the function F in which a primary differential coefficient constantly increases, but if exceeded a predetermined level, it fixedly increases, and for multiplying the function F by function G representing the shape of the transforming image, to execute the transformation computation with respect to the input read-address data; transforming means 26 and 27 for transforming the computation by the compute means into the orthogonal coordinates; wherein the video signal S1 is read from the memory 11 on the basis of the read-address converted to orthogonal coordinate data, so that a lens effect is given with respect to an image formed by the input video signal S1.

Further, in the compute means 24 and 25, the transformation computation with respect to the input read-address is obtained by the following equation:

$$r' = G(\theta) \times F\left\{ \frac{r}{G(\theta)} \right\} \quad (1)$$

Here, "r" is representative of a curvature radius of the transforming image, and "G(θ)" is representative of the shape of the transforming image.

Further, in the compute means 24 and the transformation computation is rendered with respect to the input read-address by the following equation:

$$G'(\theta) = M(\theta) = \frac{R_P}{R_S} \quad (2)$$

Here, "$R_p$" is representative of a radius of pattern of the transforming image, and "$R_S$" is representative of a radius of a circumcircle with respect to the transforming image.

Further, in the compute means 24 and 25, the transformation computation with respect to the input read-address is rendered by the following equation:

$$G'(\theta) = G(\theta + P_S) \quad (3)$$

Here, "θ" is representative of the angle from the center of the transforming image, "$P_S$" is representative of a rotation angle of the pattern of the transforming image, and "G(θ)" is representative of the shape of the transforming image.

Further, in the compute means 24 and 25, the transformation computation with respect to the input read-address is rendered by the following equation:

$$G'(\theta) = M(\theta + P_S) \times G(\theta + P_S) \quad (4)$$

Here, "θ" is representative of the angle from the center of the transforming image, "$P_S$" is representative of the rotation angle of the pattern of the transforming image, G(θ) is representative of the shape of the transforming image, and "M(θ)" is representative of a value divided the radius of the pattern of the transforming image $R_p$ into the radius of the circumcircle with respect to the transforming image $R_S$.

Further, in the compute means 24 and 25, the transformation computation with respect to the input read-address is rendered by the following equation:

$$G'(\theta) = M(\theta + P_S) \times G(\theta) \quad (5)$$

Here, "θ" is representative of the angle from the center of the transforming image, "$P_S$" is representative of the rotation angle of the pattern of the transforming image, "G(θ)" is representative of the shape of the transforming image, and "M(θ)" is representative of the value divided the radius of the pattern of the transforming image $R_p$ into the radius of the circumcircle with respect to the transforming image $R_S$.

Further, in the compute means 24 and 25, the transformation computation with respect to the input read-address is rendered by the following equation:

$$G'(\theta) = M(\theta) \times G(\theta + P_S) \quad (6)$$

Here, "θ" is representative of the angle from the center of the transforming image, "$P_S$" is representative of the rotation angle of the pattern of the transforming image, "G(θ)" is representative of the shape of the transforming image, and "M(θ)" is representative of the value divided the radius of the pattern of the transforming image $R_p$ into the radius of the circumcircle with respect to the transforming image $R_S$.

Further, the compute means 24 and 25 compute a function forming the transforming image F wherein, first, the primary differential coefficient constantly increases as a function forming the transforming image, and if exceeded a predetermined level $R_S$, it fixedly increases along the constant increasing curve.

Further, the compute means 24 and 25 compute a function forming the transforming image F wherein, first, the primary differential coefficient constantly increases as a function forming the transforming image, and if exceeded a predetermined level $R_S$, it fixedly increases away from the constant increasing curve.

Further, the compute means 24 and 25 for computing a function forming the transforming image F wherein, first, the primary differential coefficient constantly increases as a function forming the transforming image, and if exceeded a predetermined change point level $R_S$, it fixedly increases away from the constant increasing curve, which change the change point level $R_S$, Further, the compute means 24 and 25 change the function representing the shape of the transforming image G.

Further, the compute means 28 and 29 give off-set data $X_C$, $Y_C$ to the input read-address data and execute the transformation computation, and then give again the off-set data.

Furthermore, the compute means 28 and 29 give a stepped off-set data to the input read-address data and execute the transformation computation, and then give again the stepped off-set data to the transformed read-address data.

As described above, according to this invention, a transformed image is formed by using a function by which the distance from the center of the transformed image varies corresponding to its angle about such center. Thereby, it can be realized an image transformation apparatus in which various shapes of lens effect can be rendered.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
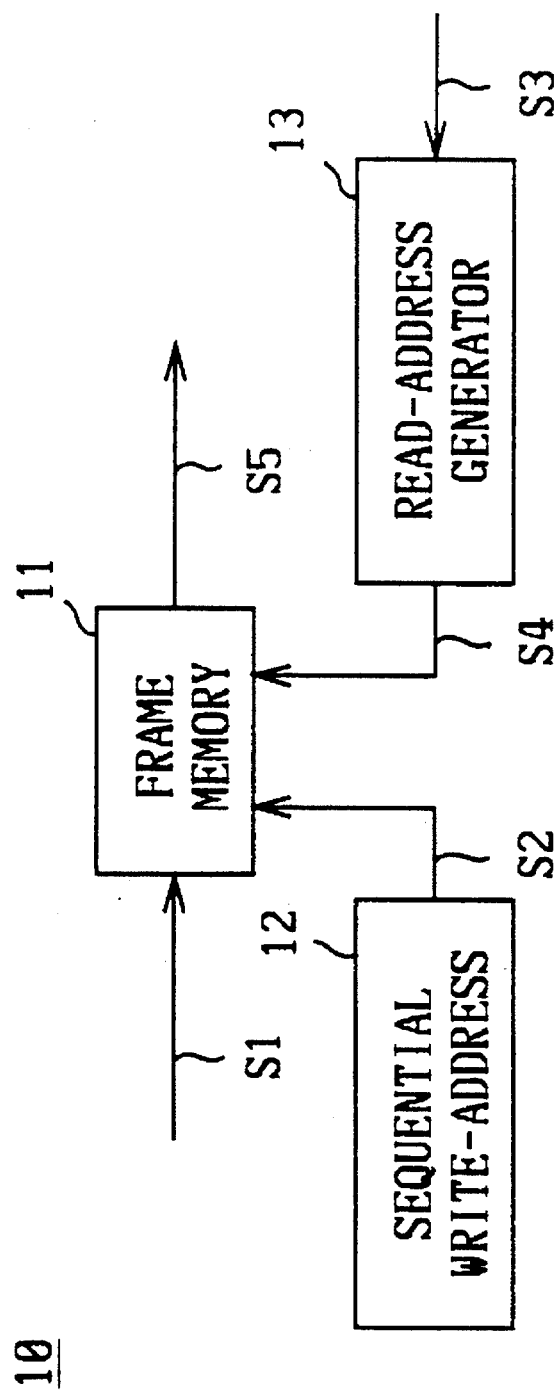
FIG. 1 is a block diagram showing an embodiment of image transformation apparatus according to this invention.

Preferred embodiments of this invention will be described with reference to the accompanying drawings:

In FIG. 1, 10 generally shows an image transformation apparatus, where a digitized input video signal S1 is written to a frame memory 11 without transforming the image, on the basis of a write-address signal S2 output from a sequential write-address counter 12.

Further, a read-address generating circuit 13 for generating a read-address data for reading image data from the frame memory 11, inputs a sequential read-address signal S3 to process it, and then outputs the processed read-address data to the frame memory 11 as a read-address signal S4, so that an output video signal S5 is read out from the frame memory 11 based on the above read-address data to form an image which is transformed the input signal S1 in the predetermined manner.

Figure 2:
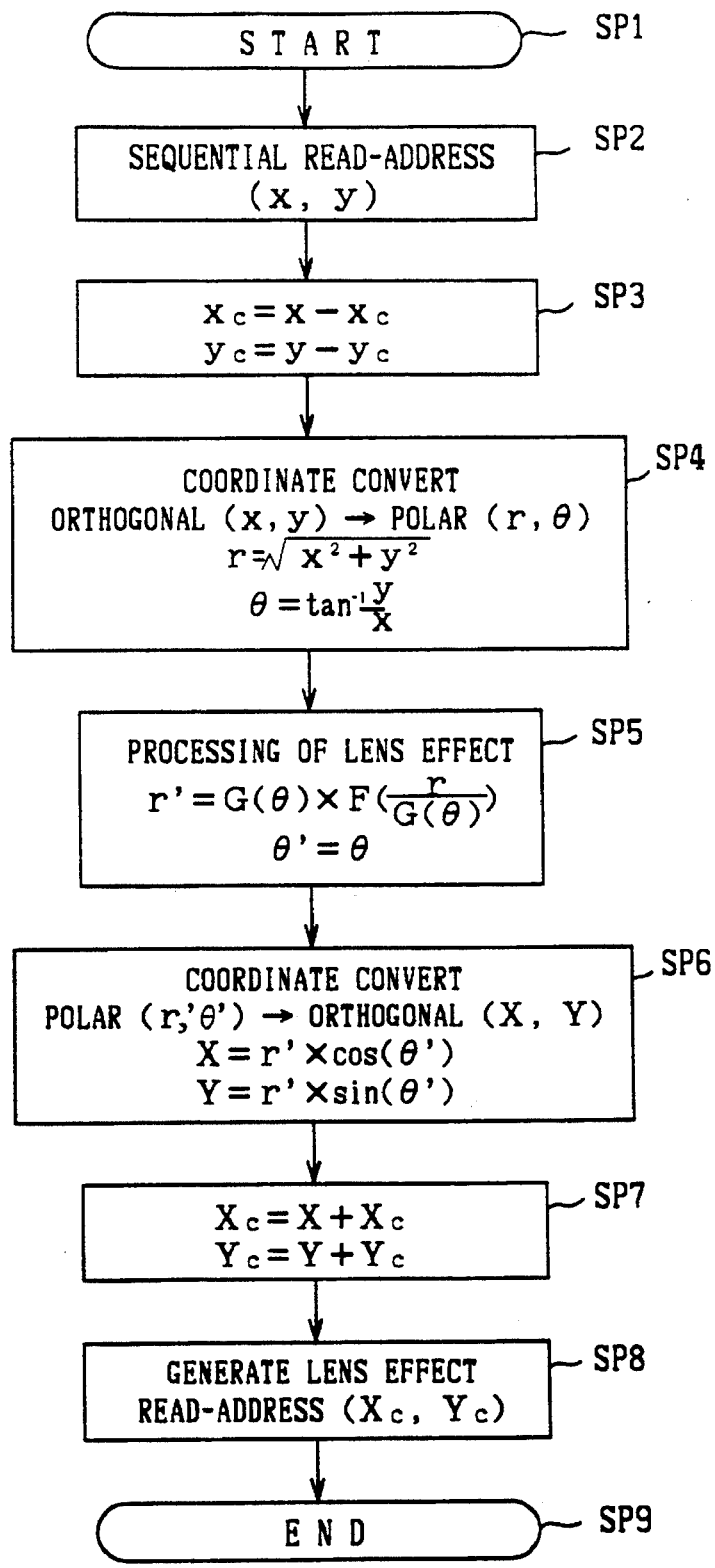
FIG. 2 is a flowchart illustrating the generation processing of a lens effect read-address in the image transformation apparatus shown in FIG. 1.

FIG. 2 shows the processing of generation of a lens effect read-address in the read-address generating circuit 13. The read-address generating circuit 13 starts the above processing at the step SP1, at the succeeding step SP2, inputs the sequential read-address data designated by the orthogonal coordinate system (x, y), on the basis of the read-address signal S3, and then it proceeds to the succeeding step SP3.

At the step SP3, the read-address generating circuit 13 obtains the center of the effect $x_c$ (=x $-X_c$) and $Y_c$ (=Y$-Y_c$), and at the succeeding step SP4, the orthogonal coordinates (x, y) are transformed into the polar coordinates (r, $\theta$) by the following equations:

$$r = \sqrt{x^2 + y^2} \tag{7}$$

$$\theta = \tan^{-1}\left[\frac{y}{x}\right] \tag{8}$$

Further, at the succeeding step SP5, the read-address generating circuit 13 executes the lens effect processing by the following equations:

$$r' = G(\theta) \times F\left\{\frac{r}{G(\theta)}\right\} \tag{9}$$

$$\theta' = \theta \tag{10}$$

Figure 3:
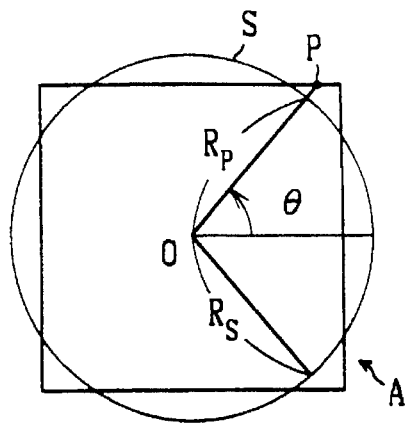
FIG. 3 is a curve linear diagram showing the function $G(\theta)$ used in the image transformation apparatus shown in FIG. 1.

Here, since the function $G(\theta)$ in Equation (9) is the pattern function for regulating the shape of a lens, when generating a pattern A as shown in FIG. 3, if the radius of a reference circle S is represented by "$R_S$", and the radius of the pattern A at an angle $\theta$ is represented by "$R_p$", the function $G(\theta)$ becomes the periodic function represented by the following equation:

$$G(\theta) = \frac{R_P}{R_S} \quad (0 \leq \theta < 2 \times \pi) \tag{11}$$

Figure 4A:
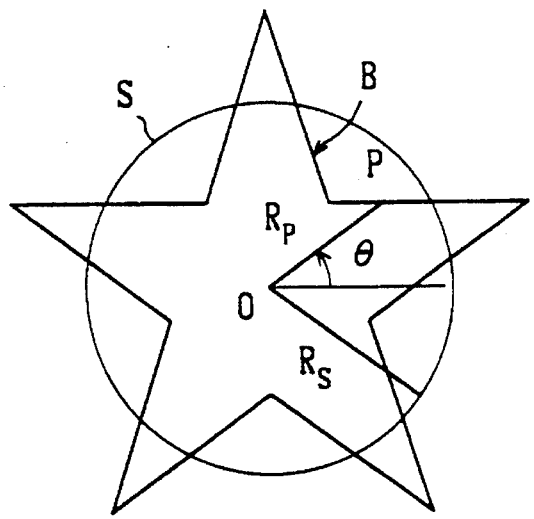
FIGS. 4A and 4B are schematic diagrams illustrating star and heart transformed images obtained by the image transformation apparatus shown in FIG. 1.
Figure 4B:
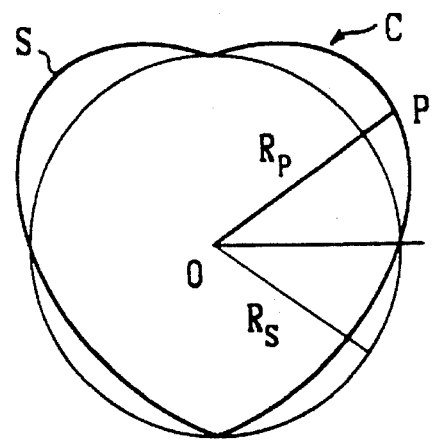

By using such periodic function, for example, a star pattern B (FIG. 4A) and a heart pattern C (FIG. 4B) can be formed.

Figure 5:
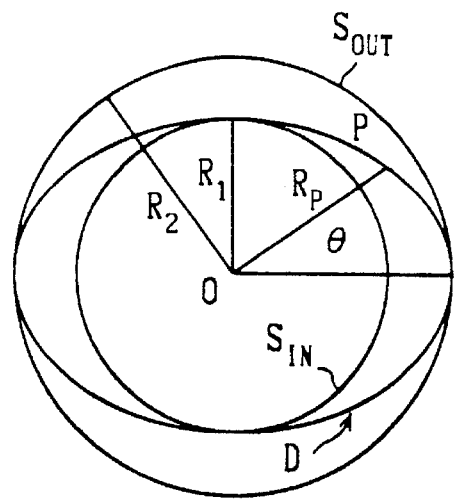
FIG. 5 is a schematic diagram illustrating an outline of the aspect ratio function $M(\theta)$ used in the image transformation apparatus shown in FIG. 1.

Further, since the periodic function can be modified into the following equation:

$$G'(\theta) = M(\theta + P_S) \times G(\theta + P_S) \tag{12}$$

the control of it is possible by the rotation angle $P_S$ of a lens pattern D and an aspect ratio $A_S$ of the pattern as shown in FIG. 5.

Provided that, in FIG. 5, if the radius of an inscribed circle $S_{IN}$ is represented by "$R_1$" and the radius of a circumcircle $S_{IN}$ is represented by "$R_2$", the function $M(\theta)$ of $\theta$ must satisfy the following equations:

$$M(\theta) = \frac{R_P}{R_2} \quad (13)$$

$$A_S = \frac{R_1}{R_2} \quad (14)$$

Figure 6A:
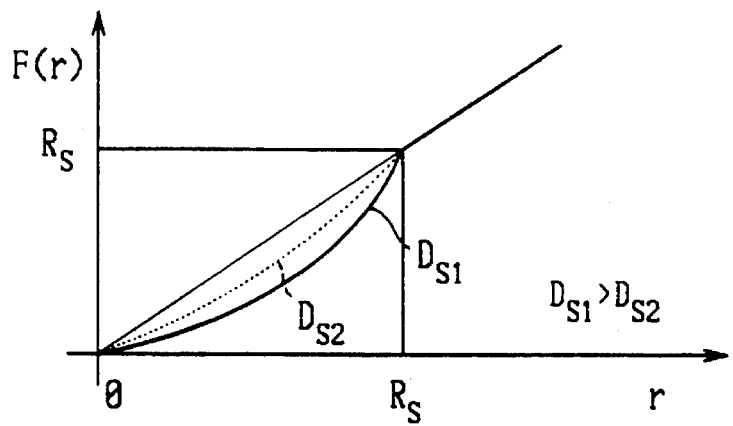
FIGS. 6A and 6B are schematic diagrams illustrating the function $F(r)$ used in the image transformation apparatus shown in FIG. 1, and the output transformed image.
Figure 6B:
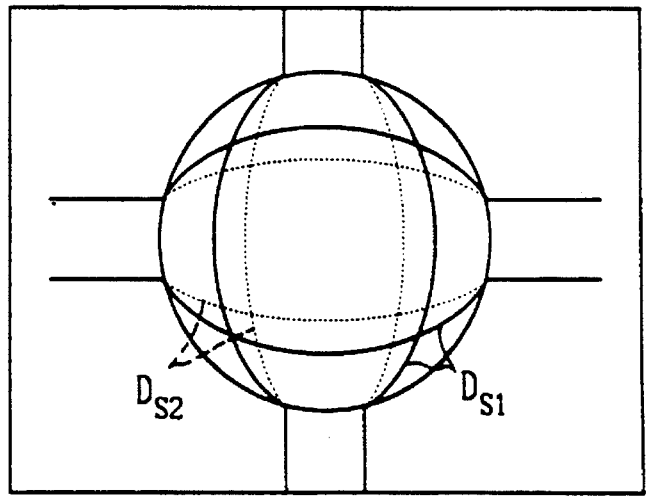

Further, the function F(r) is a function for regulating the manner by which the image appears when seen through a lens, and as shown in FIGS. 6A and 6B, if the curvature of the lens is represented by "$D_S$", and the radius of the lens is represented by "$R_S$", it may be controlled by curvatures $D_{S1}$ and $D_{S2}$.

Upon completing processing of the lens effect at the step SP5 of FIG. 2 in this manner, the read-address generating circuit 13 proceeds to the succeeding step SP6 to transform the polar coordinates (r', θ') into the orthogonal coordinates (X, Y) by the following equations:

$$X = r' \times \cos(\theta') \quad (15)$$

$$Y = r' \times \sin(\theta') \quad (16)$$

and at the succeeding step SP7, adds respective the center of the effect ($X_C$, $Y_C$) to the orthogonal coordinates (X, Y), to obtain the read-address data generating the lens effect $X_C$ and $Y_C$.

Figure 7:
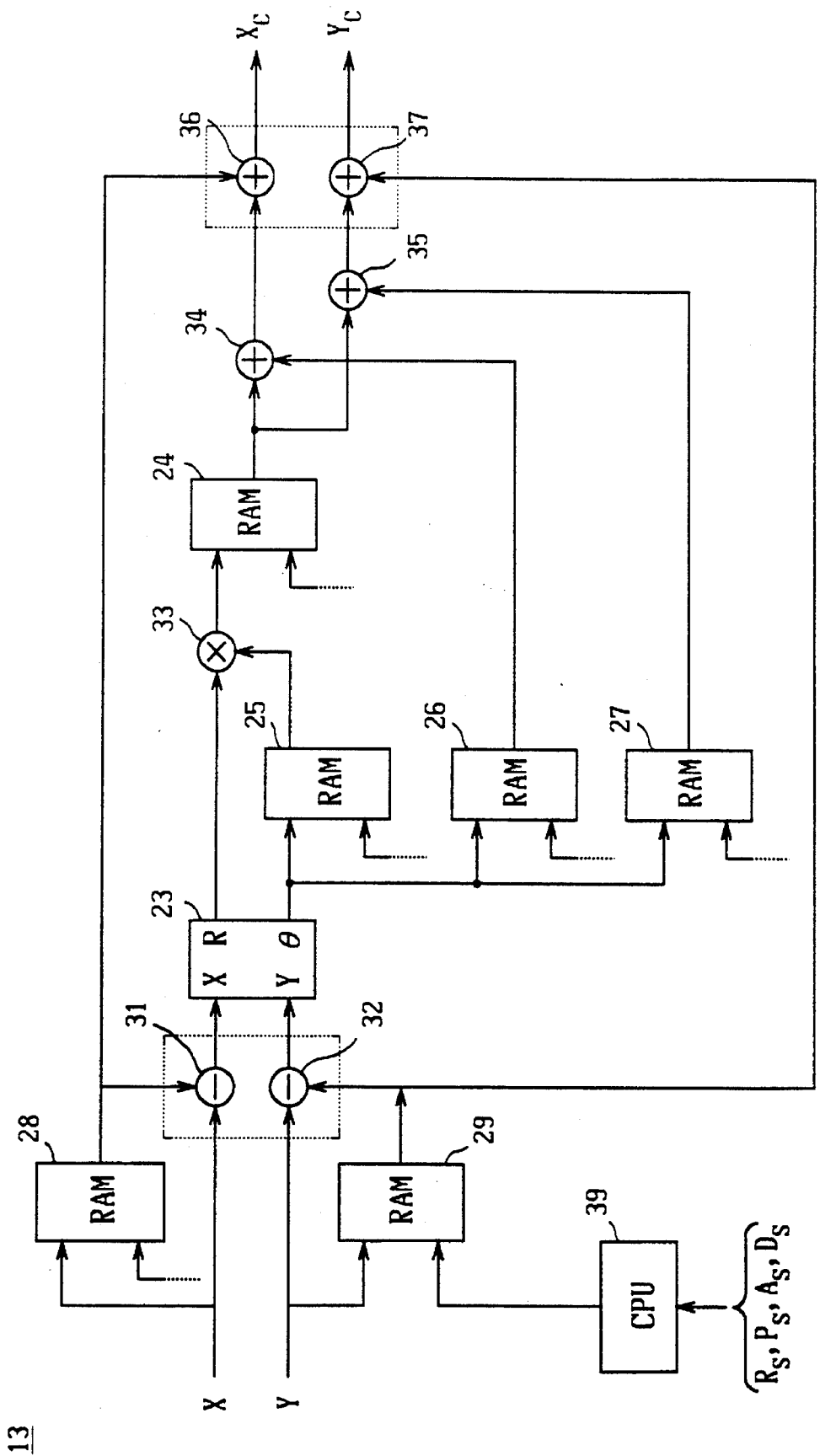
FIG. 7 is a block diagram showing an embodiment of the construction of a read-address generating circuit in the image transforming apparatus shown in FIG. 1.

Here, as shown in FIG. 7, the read-address generating circuit 13 sends the sequential read-address x to a RAM 28 and a subtracter 31. The RAM 28 to which the center of the effect $X_C$ has been stored, transforms the read-address x into the center data $X_C$ and outputs it to the subtracter 31. The subtracter 31 obtains the subtraction value between the read-address x and the center data $X_C$, and outputs it to a coordinate transforming circuit 23.

Also, the sequential read-address y is sent to a RAM 29 and a subtracter 32. The RAM 29 to which the center of the effect $Y_C$ has been stored, transforms the read address y into the center data $Y_C$ and outputs it to the subtracter 32. The subtracter 32 obtains the subtraction value between the read-address y and the center data $Y_C$, and outputs it to the coordinate transforming circuit 23.

The coordinate transforming circuit 23 transforms the orthogonal coordinates (x, y) into the polar coordinates (R, θ) and outputs a distance data R to a multiplexer 33. Further, an angle data θ is input to RAMs 25, 26, and 27.

Each of RAMs 25, 26, and 27 is a table to refer in accordance with the angle data θ. In the RAM 25, the data of r''=1/G(θ) has been selected by the CPU 39, in the RAM 26, the data of cos(θ')=cos(θ) has been selected by the CPU 39, and in the RAM 27, the data of sin(θ')=sin(θ) has been selected by the CPU 39.

Further, the output of the RAM 25 is sent to the multiplier 33 to multiply by the distance data R output from the coordinate transforming circuit 23, and then input to a RAM 24. In the RAM 24, the data of r'=F(r) has been selected by the CPU 39. The output of the RAM 24 is input to adders 34 and 35 to add the output of the RAM 26 in the adder 34, and then further added the output of the RAM 27 in the adder 35.

The output of the adder 34 is input to the adder 36 to add the output of the RAM 28, and then output as a read-address $X_C$. The output of the adder 35 is input to the adder 37 to add the output of the RAM 29, and then output as a read-address $Y_C$.

According to the above construction, the processing related to the function G(θ) which is determined by the radius $R_S$ of the reference circle S and the radius $R_r$ of the lens pattern D at an angle θ is added in computing the read-address, so that the shape of the lens can be varied to those other than a circle, for example, a star, a heart, etc..

Figure 8:
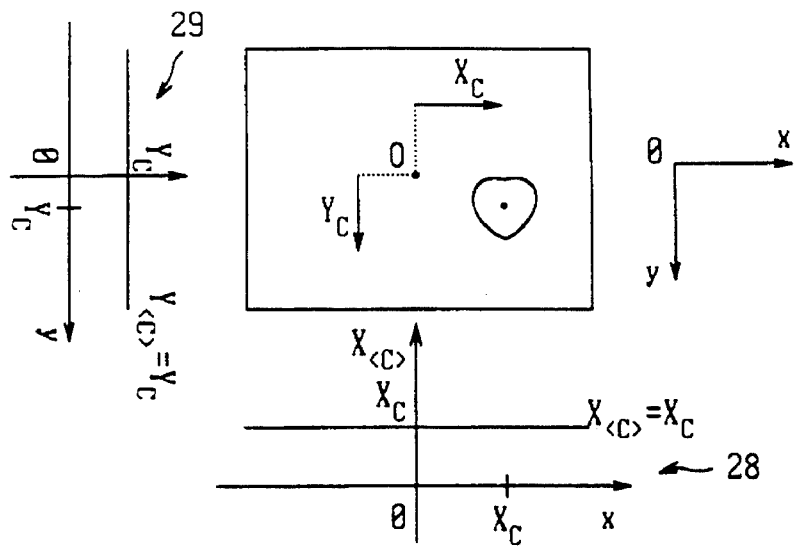
FIG. 8 is a schematic diagram explaining an operation of the case where the center of lens is offset in the image transformation apparatus shown in FIG. 1.
Figure 9:
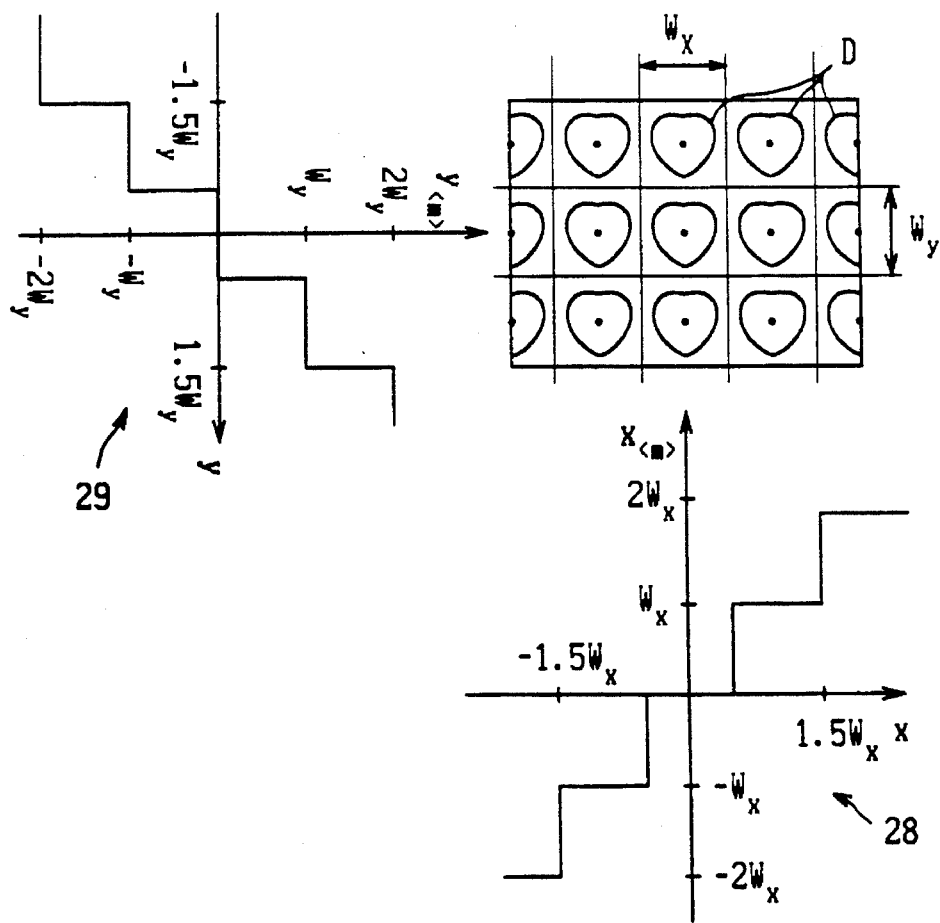
FIG. 9 is a schematic diagram showing the effect of the multiplexed lens effect.

Note that, in the above embodiments, only one lens pattern is formed on a screen. However, this invention is not only limited to this, but for example, based on the relation between the center of the lens ($X_c$, $Y_c$) and the tables in the RAMs 28 and 29 as shown in FIG. 8, a plurality of lens pattern may be formed by setting the repetition interval of the lenses as $W_x$, $W_y$ as shown in FIG. 9.

Further, in the above embodiments, the lens effect is obtained on a two-dimensional plane. However, this invention is not only limited to this, but the sequential read-address (x, y) input to the read-address generating circuit 13, may be one which has been processed through a three-dimensional matrix.

That is, if the read-address processed through the three-dimensional matrix is represented by "$x_{3D}$, $Y_{3D}$", and a three-dimensional converting matrix is represented by "$a_{11}$ to $a_{33}$", the read-address ($x_{3D}$, $Y_{3D}$) represented by the following equations:

$$x_{3D} = \frac{\alpha_{11} \times x + \alpha_{12} \times y + \alpha_{13}}{\alpha_{31} \times x + \alpha_{32} \times y + \alpha_{33}} \quad (17)$$

$$y_{3D} = \frac{\alpha_{21} \times x + \alpha_{22} \times y + \alpha_{23}}{\alpha_{31} \times x + \alpha_{32} \times y + \alpha_{33}} \quad (18)$$

may be input to the read-address generating circuit 13.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. Apparatus for transforming input video data representing an input video image, comprising:

storage means for storing said input video data;

means for supplying a rectangular coordinate address representing a location in a transformed image;

means for converting said rectangular coordinate address to a polar coordinate address having a radius coordinate and an angular coordinate;

transforming means for transforming said polar coordinate address to a transformed polar coordinate address having a transformed radius coordinate and a transformed angular coordinate in accordance with first and second pattern functions corresponding to first and second patterns which establish a pattern of said transformed image and a curvature function which is a function of the radius coordinate of the polar coordinate address and a virtual lens having a predetermined radius of curvature producing said transformed image as if the input video image is viewed through said virtual lens having said predetermined radius of curvature, at least one of said first and second pattern functions being dependent upon said angular coordinate of said polar coordinate address and a rotation angle which establishes a rotational view of the respective pattern;

means for converting said transformed polar coordinate address to a transformed rectangular coordinate address; and means for retrieving from said storage means said input video data corresponding to said transformed rectangular coordinate address of said input video image and providing said retrieved input video data as data for said rectangular coordinate address of said transformed image.

2. The apparatus of claim 1, wherein said pattern function corresponds to a ratio of a radius value of a predetermined reference circle-to a radius value of said pattern of said transformed image at said polar coordinate address.

3. The apparatus of claim 1, wherein said first pattern is a circle having a first radius and said second pattern is a circle having a second radius different from said first radius such that the pattern of said transformed image is an oval pattern having an aspect ratio equal to a ratio of said first radius to said second radius.

4. The apparatus of claim 1, wherein the curvature function used by said transforming means to transform said polar coordinate address is comprised of first and second curvature functions which are functions of the radius coordinate of the polar coordinate address and a virtual lens having two respectively different predetermined radii of curvature to produce said transformed image as if the input video image is viewed through said virtual lens having said two respectively different predetermined radii of curvature.

5. The apparatus of claim 4, wherein the two radii of curvature of the virtual lens are perpendicular to one another.

6. Apparatus for transforming input video data representing an input video image, comprising:

storage means for storing said input video data;

means for supplying a rectangular coordinate address representing a location in a transformed image having a plurality of regions;

means for offsetting said rectangular coordinate address by a center coordinate of the region of said transformed image in which said rectangular coordinate address is located;

means for converting said rectangular coordinate address to a polar coordinate address;

transforming means for transforming said polar coordinate address to a transformed polar coordinate address in accordance with a pattern function and a curvature function which establish a pattern and curvature, respectively, of said region of said transformed image in which said rectangular coordinate address is located as if the input video image is viewed through a plurality of lenses;

means for converting said transformed polar coordinate address to a transformed rectangular coordinate address; and means for retrieving from said storage means said input video data corresponding to said transformed rectangular coordinate address of said input video image and providing said retrieved input video data as data for said rectangular coordinate address of said transformed image.

7. The apparatus of claim 6, further comprising means for back-offsetting said transformed rectangular coordinate address by said center coordinate of said region of said transformed image in which said transformed rectangular coordinate address is located.

8. Method of transforming input video data representing an input video image, comprising the steps of:

storing said input video data in a memory;

supplying a rectangular coordinate address representing a location in a transformed image;

converting said rectangular coordinate address to a polar coordinate address having a radius coordinate and an angular coordinate;

transforming said polar coordinate address to a transformed polar address having a transformed radius coordinate and a transformed angular coordinate in accordance with first and second pattern functions corresponding to first and second patterns which establish a pattern of said transformed image and a curvature function which is a function of the radius coordinate of the polar coordinate address and a virtual lens having a predetermined radius of curvature producing said transformed image as if the input video image is viewed through said virtual lens having said predetermined radius of curvature, at least one of said first and second pattern functions being dependent upon a rotation angle which establishes a rotational view of the respective first and second patterns;

converting said transformed polar coordinate address to a transformed rectangular coordinate address; and retrieving from said memory said input video data corresponding to said transformed rectangular coordinate address of said input video image and providing said retrieved input video data as data for said rectangular coordinate address of said transformed image.

9. The method of claim 8, wherein said first pattern is a circle having a first radius and said second pattern is a circle having a second radius different from said first radius such that the pattern of said transformed image is an oval pattern having an aspect ratio equal to a ratio of said first radius to said second radius.

10. The method of claim 8, wherein the curvature function used by the step of transforming is comprised of first and second curvature functions which are functions of the radius coordinate of the polar coordinate address and a virtual lens having two respectively different predetermined radii of curvature producing said transformed image as if the input video image is viewed through said virtual lens having said two respectively different predetermined radii of curvature.

11. The method of claim 10, wherein the two radii of curvature of the virtual lens are perpendicular to one another.

12. Method of transforming input video data representing an input video image, comprising the steps of:

storing said input video data in a memory;

supplying a rectangular coordinate address representing a location in a transformed image having a plurality of regions;

offsetting said rectangular coordinate address by a center coordinate of the region of said transformed image in which said rectangular coordinate address is located;

converting said rectangular coordinate address to a polar coordinate address;

transforming said polar coordinate address to a transformed polar coordinate address in accordance with a pattern function and a curvature function which establish a pattern and curvature, respectively, of said region of said transformed image in which said rectangular coordinate address is located as if the input video image is viewed through a plurality of lenses;

converting said transformed polar coordinate address to a transformed rectangular coordinate address; and retrieving from said memory said input video data corresponding to said transformed rectangular coordinate address of said input video image and providing said retrieved input video data as data for said rectangular coordinate address of said transformed image.

* * * * *